United States Patent [19]
Breidigan et al.

[11] Patent Number: 5,168,195
[45] Date of Patent: Dec. 1, 1992

[54] MAGNETIC FIELD COMPENSATION APPARATUS

[75] Inventors: Robert A. Breidigan, Lancaster, Pa.; Lawrence E. Smith, Indianapolis, Ind.

[73] Assignee: Thomson Consumer Electronics, Inc., Indianapolis, Ind.

[21] Appl. No.: 743,041

[22] Filed: Aug. 9, 1991

[51] Int. Cl.[5] .............................................. H04N 9/29
[52] U.S. Cl. .................................. 315/8; 315/85; 361/150
[58] Field of Search ................. 315/8, 85; 361/150, 361/149; 313/479

[56] References Cited

U.S. PATENT DOCUMENTS

| | | | |
|---|---|---|---|
| 2,962,622 | 11/1960 | Popovich | 315/8 |
| 3,106,658 | 10/1963 | Chandler et al. | 315/8 |
| 4,380,716 | 4/1983 | Romeo et al. | 315/8 |
| 4,441,052 | 4/1984 | Wilis | 361/150 X |
| 4,535,270 | 8/1985 | Frantz et al. | 315/8 |
| 4,760,489 | 7/1988 | Truskalo | 361/150 |
| 4,829,214 | 5/1989 | Lendaro | 315/8 |
| 4,899,082 | 2/1990 | Sands et al. | 315/8 |
| 5,015,915 | 5/1991 | Hartmann et al. | 315/8 |

Primary Examiner—Eugene R. LaRoche
Assistant Examiner—Son Dinh
Attorney, Agent, or Firm—Joseph S. Tripoli; Joseph J. Laks; Daniel E. Sragow

[57] ABSTRACT

A compensating coil for a scanning electron beam display, such as a color television tube, reduces undesirable deflection of the electron beams due to ambient magnetic fields, in particular the geomagnetic field. The coil has a winding disposed to encircle the tube neck, perpendicular to the Z axis. A degaussing coil is positioned on the tube envelope to provide for demagnetizing metal structures within the envelope. In order to provide more complete degaussing, the supply current to the compensating coil is interrupted during the degaussing operation. In order to prevent a charge from accumulating on the compensating coil, one terminal is coupled through a resistor to a source of reference potential.

12 Claims, 3 Drawing Sheets

MAGNETIC FIELD COMPENSATION APPARATUS

This invention relates to the cancellation of ambient magnetic fields incident on a scanning electron beam apparatus such as a television display, and in particular to a supplemental compensation coil for cancelling the effects of magnetic fields, such as a geomagnetic field, on large color television receivers. The compensation coil is provided with adjustment means for setting the compensation field level as required for a particular geographic location and orientation of the television display.

In a color television CRT display, the display screen on a face of the tube is provided with a matrix of grouped phosphor areas wherein three phosphor stripes, or the like, define each unit of the display. Each of the stripes in a group emits light in one of three additive primary colors when excited by an electron beam. An electron gun structure is disposed at one end of tube, and three electron beams are directed through a shadow mask onto the screen phosphors. The shadow mask has a matrix of openings aligned with the phosphor areas and with the electron gun structure such that when the three electron beams are directed at a particular phosphor group defining a unit of the display, the electrons from each beam impinge only on that section of the grouped phosphors containing the phosphors for the color associated with that particular beam. These nearby areas are aligned relative to the respective opening in the shadow mask to receive only electrons from their respective beams.

Electrons for exciting the screen phosphors are electrostatically accelerated from the electron gun structure to the screen. The beams from all three guns are scanned to form a raster when passing over the grouped phosphors. The scanning is accomplished by magnetic fields varying at the horizontal and vertical scanning rates, produced by deflection coils disposed on the tube adjacent the electron gun structure. The electron gun structure is at one end of a funnel-shaped tube having a narrow neck, and the deflection coils are disposed along the neck of the tube. The deflection coils produce magnetic fields aligned vertically for horizontal (X axis) deflection and horizontally for vertical (Y axis) deflection, relative to a center line of the electron beams, which defines a Z axis. The moving electrons comprise a current, and when subjected to the magnetic fields of the deflection coils, the electrons are accelerated in the X and/or Y directions and follow a curving path.

Ideally, the deflection coils occupy a limited extension and have relatively confined fields along the Z axis. Therefore, the electrons are vertically and/or horizontally accelerated for deflection purposes in a limited area. After emerging from the deflection field region, the electrons pass in a substantially straight line from the deflection coils to the point at which the electrons impinge on the screen phosphors through the shadow mask.

Insofar as after such deflection the electrons passing between the deflection coils and the screen are subjected to ambient magnetic fields, they are likewise accelerated by such fields and follow a curving path leading toward the screen. The extent and direction of curving depends on the flux density, source and orientation of the further magnetic fields. The deflection of the electron beams by the further magnetic fields, and the curvature of the electron beam path thereby produced, can be such as to misalign the electron beams relative to the shadow mask. As a result, electrons from a given electron beam may impinge partly on the color phosphors adjacent their intended color phosphors rather than only on the intended color phosphors, producing a deterioration of the purity of displayed colors.

Some magnetic fields affecting electron beam deflection are due to the unwanted magnetization of magnetically permeable elements of the display apparatus. The shadow mask may be steel. A steel rim is normally provided around the periphery of the faceplate including the screen, for protection against implosion of the picture tube in the event of breakage. An internal magnetic shield along the funnel shaped surface of the tube between the deflection coils and the screen face plate may also be provided, and is a magnetically permeable element. If these elements become magnetized, color purity is affected. Furthermore, magnetization of the internal magnetic shield can affect its permeability and decrease its effectiveness to isolate the electron beam path from incident fields such as the earth's magnetic field.

To overcome magnetization of permeable elements of the display, a degaussing coil is provided through which is passed a decreasing AC current. Such a decreasing AC current will demagnetize or degauss the permeable elements of the display, to a level that will not cause color purity problems. However, there are other magnetic fields which may affect purity. A major source of such fields is the earth's magnetic field or a geomagnetic field. In order to compensate for such other fields, field cancellation apparatus may be provided to apply to the tube a countervailing DC magnetic field. The apparatus may use a coil placed on the neck of the tube. A DC current is applied to the coil, to generate a magnetic field to counter effects of the other fields.

The earth's magnetic field is an ambient field having horizontal and vertical components tending to deflect the electron beams so as to adversely affect color purity and the shape of the raster. Depending on the orientation of the CRT Z axis relative to the earth's magnetic poles, the geomagnetic field components may deflect the beams horizontally or vertically (due to vertical and horizontal field components, respectively) and may produce a twist of the raster (i.e., rotation of the beams about the Z axis).

The earth's field is not great in magnitude relative to the magnitude of the deflection coil fields; however, the earth's field accelerates and deflects the electron beams over a relatively long span as compared to the span of the deflection coils. Accordingly, there is a need to reduce the effect of the geomagnetic field.

An adjustable DC current supply may set the level and polarity of the compensation field, the adjustments being set when installing or moving the CRT, for optimum compensation.

It has been found that degaussing is never absolutely complete. There is always some remaining field produced by the permeable portions of the picture tube. The degaussing process reduces this remaining field to a level that does not adversely affect color purity. However, if the magnetic field compensation coil is energized during the degaussing operation, the DC field generated by the compensation coil imparts a bias to the degaussing field, which decreases the effectiveness of the degaussing process. As a result, the permeable portions of the picture tube generate magnetic fields which degrade color purity.

An aspect of the present invention eliminates the effect of the compensation field on the degaussing field by decoupling the magnetic field compensation coil from its DC current supply during the degaussing interval, when the degaussing coil is energized by AC current. In this way, the field produced by the compensating coil does not affect the degaussing operation.

If the field compensating coil is disconnected from its source during operation of the receiver, the compensating coil may accumulate a charge due to its proximity to the ultor terminal of the picture tube. Such an accumulated charge may cause arcing that could damage sensitive portions of the receiver circuitry.

It is therefore another aspect of the present invention to prevent accumulation of static charge on the magnetic field compensation coil by coupling a high value resistor from the field compensation coil to a source of reference potential.

An inventive arrangement provides a magnetic field compensation coil apparatus for a picture tube having an electron gun structure disposed in a neck and emitting an electron beam toward a display screen. The picture tube is subject to an ambient magnetic field. A magnetic field compensation coil is positioned on the picture tube. A source of compensation current is coupled to the magnetic field compensation coil for compensating for the ambient magnetic field. A degaussing coil is positioned on the picture tube. A source of AC current is coupled to the degaussing coil for a predetermined interval for demagnetizing metal structures in the picture tube. Means decouple the magnetic field compensating coil from the source of compensating current during the predetermined interval so as to eliminate interference by the magnetic field compensating coil during demagnetizing the permeable elements.

Another inventive arrangement provides a magnetic field compensation coil apparatus for a picture tube having an electron gun structure disposed in a neck and emitting an electron beam toward a display screen. The picture tube is subject to an ambient magnetic field. A magnetic field compensation coil is positioned on the picture tube. A source of compensation current is coupled to the magnetic field compensation coil for compensating for the ambient magnetic field. Means prevent static charge from accumulating on the magnetic field compensating coil.

Figure 1:
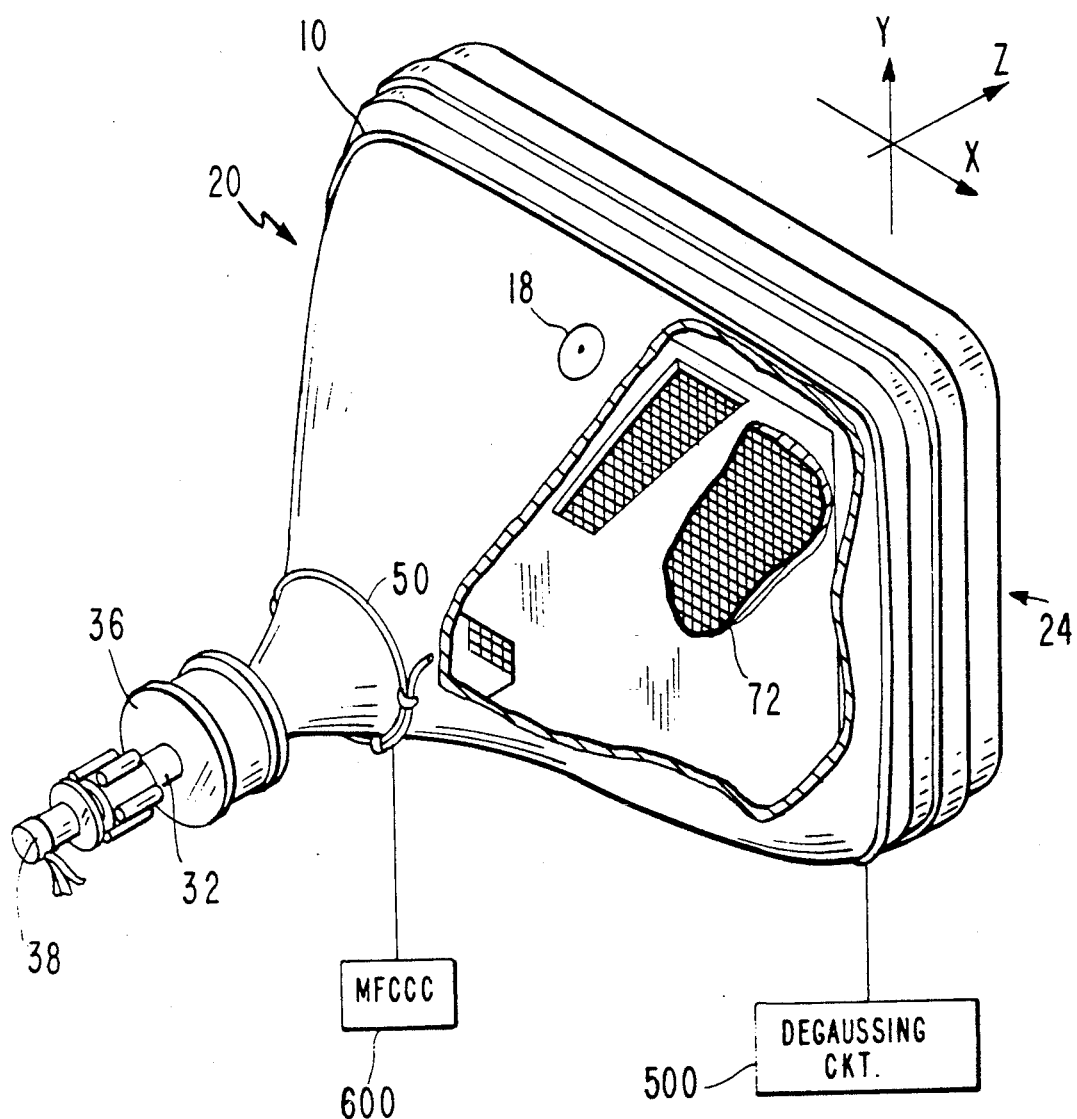
FIG. 1 is a perspective view of a cathode ray tube (CRT) equipped with a compensating coil and a degaussing coil, showing the degaussing circuit and magnetic field compensation coil circuit according to the invention, in block form.

FIG. 1 illustrates the apparatus in cut-away perspective view. A scanning electron beam display apparatus, particularly a color television cathode ray tube (CRT), has an electron gun structure 38 disposed at the end of a neck 32 of a tube 20. The electron gun structure emits three electron beams, which are electrostatically accelerated toward the screen 24, due to a large potential difference between the electron gun and shadow mask 72. The screen 24 defines the X axis and Y axis, perpendicular to the Z axis. The screen 24 of a color television has discrete colored phosphor areas in grouped sets corresponding to the three electron beams. The phosphor areas are positioned relative to the apertures in shadow mask 72 such that each of the three electron beams illuminates one of the colored phosphors and the shadow mask blocks the other colors. Deflection coils 36 are disposed along the tube 20 for scanning the electron beams in the X and Y directions, producing a scanned raster. A degaussing coil 10 is positioned around the tube to demagnetize metal portions of the tube, when energized by degaussing circuit 500.

As shown in FIG. 1, a cathode ray tube 20 of a scanning electron beam apparatus, in particular a color television display, has a compensating coil 50 for reducing or eliminating unwanted deflection of the electron beams emitted from an electron gun 38 at the tube end, directed to phosphors disposed on a screen 24. Unwanted deflection occurs due to ambient magnetic fields, in particular a geomagnetic field, which has vertical and horizontal components depending on the latitude and orientation of the color television display relative to the geomagnetic poles.

Deflection of the electron beams due to incident magnetic fields occurs because the electron beams define a current which is subject to a force perpendicular to the direction of the current and perpendicular to the direction of the flux lines of the incident magnetic field. The current is directed generally along the Z axis, defined as the line from the electron guns to the screen center, and has components along the X (horizontal) and Y (vertical) axes. Insofar as there is an ambient vertical magnetic field incident on the electron beams over the length of the Z axis, horizontal deflection of the electron beams occurs, adversely affecting color purity. The magnetic field component along the Z axis influences the beam position due to both vertical and horizontal components of the current, producing a twist of the raster of increasing magnitude toward the edges of the raster. The incident magnetic field is therefore evident in the color picture display as a deterioration in color purity and a distorted raster which may be most severe at the raster edges.

To neutralize the geomagnetic field, a compensating coil 50 is mounted on the tube 20 and connected to a variable direct current source 600 that is adjustable when setting up the display apparatus at its desired location, and also thereafter if the display is moved to a different orientation relative to the earth's poles (and relative to other fixed sources of steady state magnetic fields).

The magnetic field compensating coil 50 reduces undesirable deflection of the electron beams due to the ambient magnetic field. The field compensating coil 50 is disposed generally perpendicular to the Z axis, thereby supplying a compensating magnetic field with a Z axis component.

Figure 2:
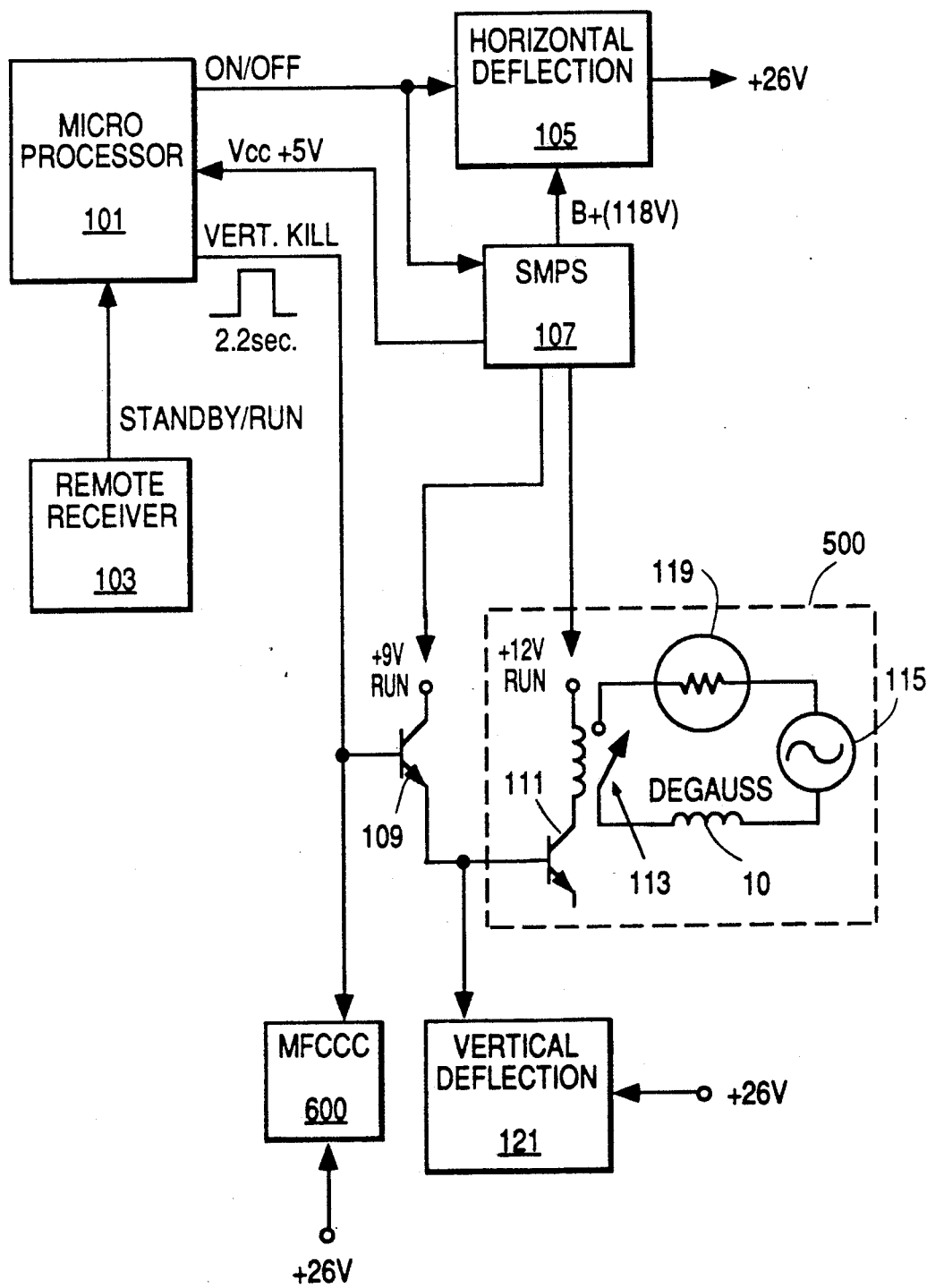
FIG. 2 is a diagram, partially in block and partially schematic, showing a portion of a television receiver using the invention.

FIG. 2 shows a portion of a television receiver using a magnetic field compensating coil circuit according to the invention. Microprocessor 101 receives a standby/run signal from remote receiver 103. In response to a run signal from remote receiver 103, microprocessor 101 generates an on signal which is fed to horizontal deflection circuit 105 and switch mode power supply circuit 107. Although switch mode power supply 107 supplies B+ power to horizontal deflection circuit 105 and $V_{CC}$ power to microprocessor 101, at all times that the receiver is energized, the power supply 107 supplies 9 volts to vertical control transistor 109 and 12 volts to degaussing circuit 500 only during the run mode.

When the run mode is initiated, horizontal deflection circuit 105 starts operation, and generates the +26 V supply voltage which is fed to vertical deflection circuit 121. At the same time, switched mode power supply 107 generates the +9 volt run supply for transistor 109 and the +12 volt run supply for degaussing circuit 500.

Additionally at start up, microprocessor 101 generates a vertical kill signal for approximately 2.2 seconds. This vertical kill signal causes transistor 109 to conduct, which causes transistor 111 to conduct to energize degaussing relay 113. When degaussing relay 113 becomes conductive, AC source 115 passes an AC current through degaussing coil 10 and temperature dependent resistor 119. As resistor 119 is heated, its resistance increases, so that the value of the AC current passing through degaussing coil 10 decreases.

In order to prevent the vertical deflection field from interfering with the degaussing operation, the vertical kill signal from microprocessor 101 is also fed to vertical deflection circuit 121 through transistor 109 so that vertical deflection circuit 121 is disabled for the duration of the vertical kill pulse.

Simultaneously, the vertical kill pulse is fed to magnetic field compensation coil circuit 600. Operation of magnetic field compensation coil circuit 600 is more completely described with reference to FIG. 3.

Figure 3:
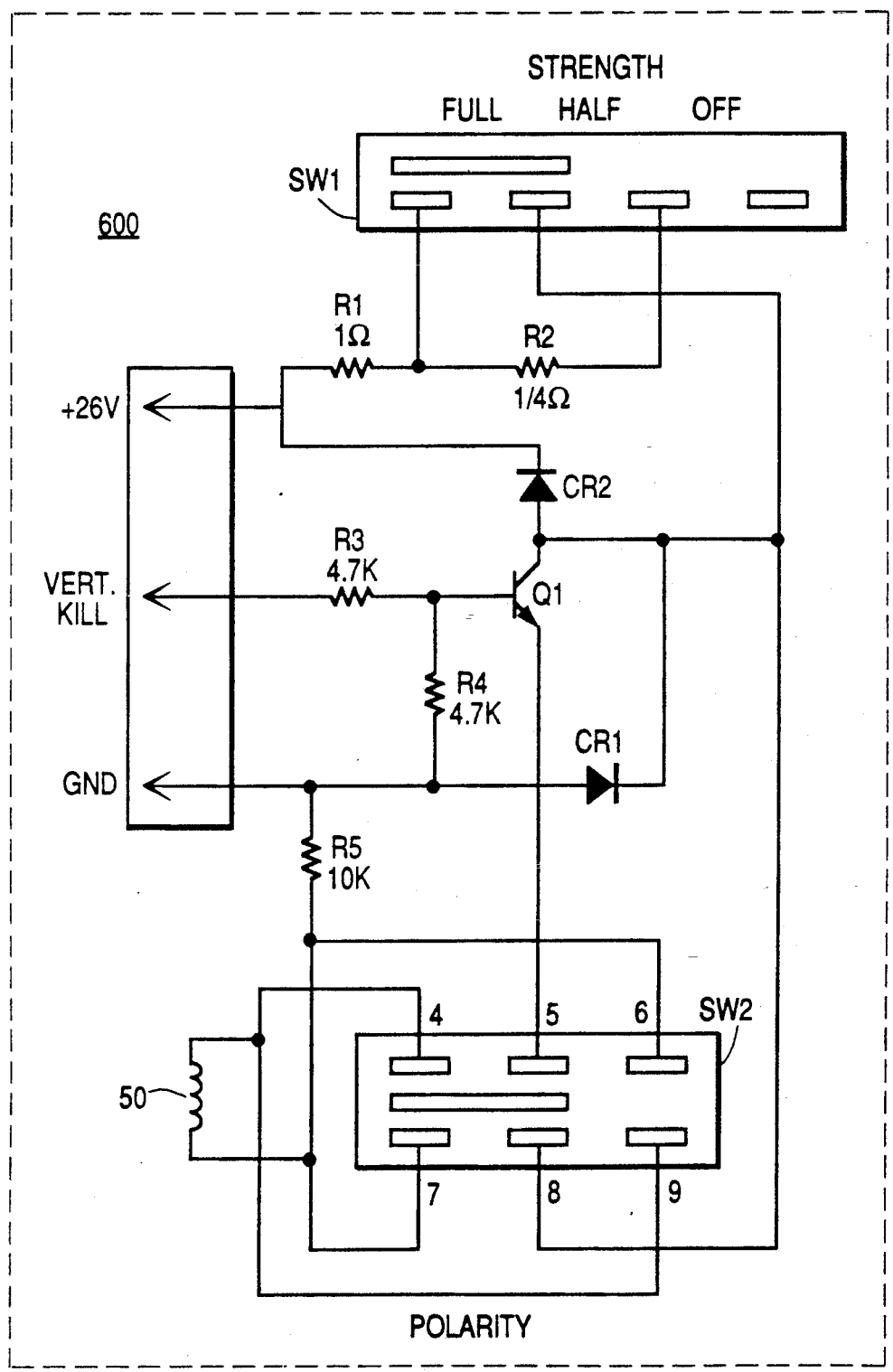
FIG. 3 is a schematic circuit diagram of a control circuit for a compensating coil.

FIG. 3 is a schematic circuit diagram of magnetic field compensation coil circuit 600. The strength of the current passing through compensating coil 50 is varied by switch SW1 while the polarity of the current passing through compensating coil 50 is determined by switch SW2.

A DC source of 26 volts, derived from the horizontal deflection circuit 105, shown in FIG. 1, is applied to input terminal 1. The input current passes through resistor R1 which has a low value, typically 1Ω, to switch SW1. In the position shown, switch SW1 couples resistor R1 through switch SW2 and compensating coil 50 to ground. A change in the position of switch SW1 additionally couples resistor R2 in series, which further decreases the current through compensating coil 50. Moving switch SW1 all the way to its rightmost position interrupts the flow of current completely.

In order to prevent the field produced by compensating coil 50 from interfering with the degaussing operation, this invention removes the current from compensating coil 50 during the degaussing operation at the beginning of the run mode. This removal operation is accomplished by applying the vertical kill signal to terminal 2. The vertical kill signal is coupled through resistor R3 to the base of transistor Q1. Resistor R4 is used as a base load resistor to ground terminal 3. The emitter of transistor Q1 is coupled to ground while the collector is coupled to the output of switch SW1, and the emitter is coupled to ground terminal 3.

In the presence of vertical kill signal at terminal 2, positive voltage is applied to the base of transistor Q1, which causes it to be conductive. Conduction of transistor Q1 causes the output terminal of switch SW1 to be coupled to ground, thus bypassing current away from compensating coil 50. In this way, compensating coil 50 receives no current during the presence of a vertical kill signal at terminal 2.

Switch SW2 is a reversing switch. When it is in the position shown in FIG. 3, a positive voltage is applied to the lower terminal of compensating coil 50, while the upper terminal is coupled to ground. When reversing switch SW2 is in the position opposite to that shown in FIG. 3, the positive voltage is coupled to the upper terminal of compensating coil 50 while the lower terminal is coupled to ground.

It should be noted that the heating of temperature dependent resistance 19 causes the degaussing interval to be substantially terminated before the end of the vertical kill signal.

In order to protect transistor Q1 from transients which may appear on the 26 volt line at terminal 1, or from spikes which might be induced in compensating coil 50, such as during arcing of the picture tube, diodes CR1 and CR2 provide a path from ground to the 26 volt line, which bypasses the collector-emitter path of transistor Q1.

In the event that polarity switch SW2 is inadvertently left in an intermediate position so that it is decoupled from ground, compensating coil 50 may accumulate a charge, due to its proximity to the ultor terminal 18 of the picture tube. When compensating coil 50 accumulates a sufficient charge, it may arc across the terminals of switch SW2, producing transients and possibly damaging the circuitry in the receiver. In order to solve this problem, the invention provides a resistor R5 coupled from one terminal of compensating coil 50 to ground terminal 3. Since this resistor has a high value, typically 10 KΩ, resistor R5 does not affect normal operation of compensating coil 50. However, the resistance is low enough to prevent compensating coil 50 from accumulating a charge.

What is claimed is:

1. A magnetic field compensation coil apparatus for a picture tube having an electron gun structure disposed in a neck and emitting an electron beam toward a display screen, the picture tube being subject to an ambient magnetic field; comprising:
   a) a magnetic field compensation coil positioned on said picture tube;
   b) a source of compensation current coupled to said magnetic field compensation coil, for compensating for said ambient magnetic field;
   c) a degaussing coil positioned on said picture tube remote from said field compensation coil;
   d) a source of AC current;
   e) means for coupling said source of AC current to said degaussing coil for a predetermined interval, for demagnetizing permeable elements in said picture tube; and
   f) means for preventing said magnetic field compensating coil from being energized by said source of compensation current during said predetermined interval.

2. Apparatus as defined by claim 1, wherein said means for preventing said magnetic field compensating coil from being energized eliminates interference by said magnetic field compensating coil during demagnetizing said permeable elements.

3. Apparatus as defined by claim 1, wherein said means for preventing said magnetic field compensating coil from being energized comprises means for decoupling said coil from said source of compensation current.

4. Apparatus as defined by claim 3, in which said decoupling means comprises means for bypassing said compensation current away from said magnetic field compensation coil.

5. Apparatus as defined by claim 3, in which said decoupling means is activated during deactivation of vertical deflection.

6. Apparatus as defined by claim 3, in which said decoupling means comprises a transistor switch having its main current conduction path coupled across said magnetic field compensation coil.

7. Apparatus as defined by claim 6, comprising means for protecting said transistor switch from transients which might otherwise cause excessive voltage across said main current conducting path.

8. Apparatus as defined by claim 7, in which said protecting means comprises a diode coupled in antiparallel with said main current conducting path.

9. Apparatus as defined by claim 7, in which said protecting means comprises a diode coupled from said main current conducting path to a source of potential.

10. Apparatus as defined by claim 1, comprising means for preventing static charge from accumulating on said magnetic field compensation coil.

11. Apparatus as defined by claim 8, in which said means for preventing static charge from accumulating on said magnetic field compensation coil comprises a resistor coupled from one terminal of said magnetic field compensation coil to a point of reference potential.

12. Apparatus according to claim 10, comprising a switch having first and second positions, said source of compensation current being coupled to said coil when said switch is in either of said positions, and said switch having an intermediate position in which said coil is decoupled from said source.

* * * * *